United States Patent [19]

Roggero et al.

[11] Patent Number: 4,728,702

[45] Date of Patent: Mar. 1, 1988

[54] METHOD FOR THE TERMINATION OF LIVING POLYMERS AND COMPOUNDS SUITABLE TO THAT PURPOSE

[75] Inventors: Arnaldo Roggero; Tito Salvatori, both of S. Donato Milanese, Italy

[73] Assignee: Enichem Elastomeri S.p.A., Palermo, Italy

[21] Appl. No.: 939,304

[22] Filed: Dec. 5, 1986

Related U.S. Application Data

[63] Continuation of Ser. No. 724,157, Apr. 17, 1985, abandoned.

[30] Foreign Application Priority Data

Apr. 18, 1984 [IT] Italy ................................ 20588 A/84

[51] Int. Cl.<sup>4</sup> .......................... C08F 2/38; C08F 36/06; C08F 36/08; C08F 12/08
[52] U.S. Cl. ........................................ 526/84; 526/82; 526/173; 526/335; 526/340; 526/346; 526/347; 526/280
[58] Field of Search .................. 526/82, 84, 173, 335, 526/340, 346, 347

[56] References Cited

U.S. PATENT DOCUMENTS 3,763,126 10/1973 Farrar .................................... 526/82
3,855,189 12/1974 Farrar .................................... 526/340
4,284,741 8/1981 Uraneck et al. .................. 526/82 X

*Primary Examiner*—Edward J. Smith
*Assistant Examiner*—F. M. Teskin
*Attorney, Agent, or Firm*—Birch, Stewart, Kolasch & Birch

[57] ABSTRACT

Coupling agents suitable to be synthetized by cyclo-oligomerization of 3-methylbutyn-1-ol-3 with subsequent dehydration of the alcohol compounds, and their use in a method for the termination of living polymers obtained by means of the anionic polymerization of diene and/or vinylaromatic monomers.

11 Claims, No Drawings

METHOD FOR THE TERMINATION OF LIVING POLYMERS AND COMPOUNDS SUITABLE TO THAT PURPOSE

This application is a continuation of application Ser. No. 724,157 filed on Apr. 17, 1985, now abandoned.

A anionic polymerization, if accomplished under suitable conditions and with suitable monomers (M. Szwarc, Carbanions, Living Polymers and El. Transfer Processes, Interscience Publishers, J. Wiley & Sons, New York 1968) allows living polymers to be obtained, which are well suited to suitable transformations. Among these, the coupling reaction (uniting of two or more polymer segments through a uniting agent, to yield a polymer of molecular weight nPM, wherein PM is the molecular weight of the polymer segment, and n is the functionality of the uniting agent) is certainly one of the most investigated ones in that it allows, by a simple approach, outstanding changes to be obtained in terms of the properties of treated polymers.

As an example, in the case of diene polymerization, it is possible by so doing to increase Mooney viscosity, to reduce cold flow, to increase green tensile strength and also to be able to modify the molecular weight distribution as desired.

In the case then of block polymers constituted by straight or branched links of A-B elements (wherein A is an aromatic polyvinyl and/or polyisopropenyl sequence and B is a diene sequence, which may also be hydrogenated), the use of efficient coupling agents becomes a factor of basic importance in that, as it is well known, the presence in the end product of possibly unreacted AB products impairs the technological properties thereof.

In the technical literature several examples of coupling agents are reported [H. L. Hsieh, Rubber Chem. and Techn. 49 (5), 1305 (1976)].

We have now discovered that the compounds which are exemplified hereinunder can be conventionally used as new coupling agents in that, in addition to the typical properties of the best coupling agents described in technical papers (see H. L. Hsieh,) show the following advantages:

(i) the coupling reaction can also be accomplished without the use of activators;

(ii) no by-products are formed, in that the coupling reaction is an addition reaction and not an elimination reaction.

The products which were found by us to be efficient coupling agents have the following formulas:

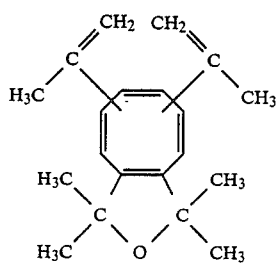

-continued

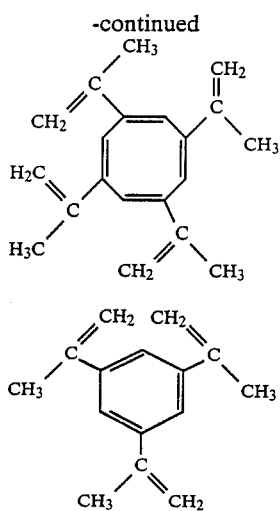

and have been obtained by cyclooligomerization of 3-methylbutyn-1-ol-3 (methylbutynol) and subsequent dehydration of the intermediate alcohol compounds, as described by: P. Chini, N. Palladino and A. Santambrogio, J. Chem. Soc. (c), 836 (1967); P. Chini, A. Santambrogio and N. Palladino, loco citato, 830 (1967); P. Bicev, A. Forlani and G. Sartori, Gazzetta Chimica Ital. 103, 849 (1973).

Non-limiting examples of alcohol compounds synthetized by cyclooligomerization are: 1,2,4,6-tetra-(1-hydroxy-1-methylethyl)-cyclo-octatetra-ene, 1,2,4,7-tetra-(1-hydroxy-1-methylethyl)-cyclo-octatetra-ene, 1,3,5-tri-(1-hydroxy-1-methylethyl)benzene and 1,3,5,7-tetra-(1-hydroxy-1-methylethyl)-cyclo-octatetra-ene, which, by dehydration, respectively, lead to: 5,7-di-isopropenyl-1,1,3,3-tetramethyl-1H,3H-cyclo-octa-[c]-furan ($A_1$); 5,8-di-isopropenyl-1,1,3,3-tetramethyl-1H,3H-cyclo-octa-[c]-furan ($A_2$); 1,3,5-tri-isopropenyl-benzene ($A_3$); and 1,3,5,7-tetra-isopropenyl-cyclo-octatetraene ($A_4$).

The compounds which are the object of the present patent application can be used in processes for the polymerization of monomers susceptible of anionic initiation under living conditions and in particular for the polymerization of diene and/or vinylaromatic monomers.

The conjugated dienes used contain from 4 to 12 carbon atoms, and preferably from 4 to 8 carbon atoms.

Such monomers comprise: 1,3-butadiene, isoprene, 2,3-dimethyl-butadiene, piperylene, 3-butyl-1,3-octadiene and 2-phenyl-1,3-butadiene.

The vinylaromatic monomers contain from 8 to 20 carbon atoms and preferably from 8 to 14 carbon atoms. Typical examples are: styrene, α-methylstyrene, 1-vinyl-naphtalene, 2-vinylnaphtalene, 2-isopropenyl-naphtalene, p-phenyl-styrene, 3-methyl-styrene, α-methyl-p-methyl-styrene, and p-cyclohexylstyrene.

The conjugated dienes and/or vinylaromatic monomers may be polymerized singly or as mixtures, or sequentially to form homopolymers, random copolymers and block copolymers.

The polymerization is carried out in solution, at temperatures comprised between −100° and +200° C. and preferably between 0° and 110° C. and under a pressure which is the pressure of the system under the used temperature conditions, but no contrary directions exist against higher or lower pressures.

Suitable solvents comprise paraffinic, cycloparaffinic and aromatic hydrocarbons. Typical examples are cyclohexane, hexane, pentane, heptane, isooctane, benzene, toluene and mixtures thereof.

It is known that small amounts of polar compounds may be added to the solvent to the purpose of obtaining, in the polymerization of the diene monomer, a 1,2-configuration, or in order to increase the efficiency of the initiator in case of polymerization of vinylaromatic monomers.

The initiators are the typical anionic initiators used to this purpose.

Preferably, the organometallic compounds of formula R-Me are used, wherein R is an aliphatic, cycloaliphatic or aromatic hydrocarbon radical and Me is an alkali metal, preferably lithium.

The amount of initiator used is a function of the polymer molecular weight which one wants to obtain. The polymerization is carried out under such conditions, as to secure the living characteristics of the polymer obtained (M. Szwarc, Carbanions, Living Polymers and El. Transfer Processes, Interscience Publishers, J. Wiley & Sons, New York 1968).

The coupling agent may be introduced into the reaction medium in any way, either as a single adding, or as a plurality of partial additions, and at the time wanted. It is preferably introduced at the end of the polymerization in the desired amount.

The molar amount of coupling agent ($m_{AC}$) to be added is given by the formula:

$$m_{AC} = m_{AC}/f_{AC}$$

wherein:
$m_{CA}$ = Moles of active centers of living polymer
$f_{AC}$ = Coupling agent functionality.

The amount of coupling agent which is used conditions the coupling yields: obviously, a stoichiometric ratio between the polymer active center and the coupling agent center (taking into account its functionality) favors the highest yield.

The temperature at which the coupling reaction is carried out depends on the type of agent used, on the type of polymer undergoing the reaction and on other parameters, e.g., on the reaction medium; it can generally vary from 50° to 150° C., but is preferably comprised between 60° and 120° C.

The contact times are comprised within the range of from some minutes to some hours: times of from 10 minutes to 2 hours are preferably used.

Sometimes also polar activators may be used, which increase the coupling rate: in the case for the more active coupling compounds herein claimed, the use of such activators is not required.

The solvents are those used in the polymerization.

The coupling reaction is carried out under a pressure which is the pressure of the system at working temperature, but higher or lower pressures can be used as well.

EXAMPLE 1

The polymerization and the coupling are carried out in a reaction vessel of 1 liter of capacity, equipped with stirrer, pressure gauge, termocouple sheath, and inlet for introducing the reactants and the inert gas.

In the order mentioned, 500 cm³ of anhydrous cyclohexane, 12 g of styrene and 1.0 mmol of Li-sec.butyl are charged, the polymerization being allowed to proceed over about 1 hour at 60° C. At the end, 30 g of butadiene are added, and the polymerization is completed at 60° C. in about 1 hour. An extremely small aliquot part of this polymer is isolated, and sent to the different analyses. At 96° C. are then injected 0.45 mmol of a solution of compound $A_1$ in cyclohexane.

After 30 minutes the polymer solution, to which 1 g of antioxidant has been added, is coagulated with an excess of methanol, about 42 g of polymer being obtained, which is dried at 60° C. for 15 hours under vacuum.

The characteristics of the polymers before and after the coupling reaction are reported in Table 1:

TABLE 1

| Sample | (a) Composition % by weight STY | (a) Composition % by weight BUT | (b) Molecular Weight g/mol Mw | (b) Molecular Weight g/mol Mn | (c) Polydispersion index | Gel % | (d) Coupling efficiency % |
|---|---|---|---|---|---|---|---|
| A-B | 30 | 70 | 54.000 | 49.600 | 1.09 | 0 | = |
| A-B-A | 30 | 70 | 124.000 | 94.600 | 1.27 | 0 | >90 |

Notes:
(a) Via N.M.R.
(b) From G.P.C. measurements according to the procedure described by L.H. Tung: J. Appl. Polym. Sci., 24, 953 (1979).
(c) Defined as $\overline{Mw}/\overline{Mn}$ ratio
(d) Defined as the ratio, measured via GPC, of the peak area relevant to the polymer after the coupling reaction (A-B-A) to the peak area of the polymer before the coupling reaction (A-B).

The A-B-A polymer of Example 1 shows the following technological properties:
Elongation: 900%
Tensile strength: 26 MPa.
whereas the corresponding A-B polymer, at the same elongation shows a tensile strength of about 3 MPa.

If instead of $A_1$, dichlorodiphenylsilane is used as the coupling agent, under the same experimental conditions, the coupling efficiency is 10% lower.

EXAMPLE 2

The test 1 is repeated with the changes, that 1.5 mmol of Li-sec.butyl and 0.45 mmol of $A_3$ are used at 105° for 30 minutes. The polymers (A-B and A-B-A) with the properties reported in Table 2 are isolated.

TABLE 2

| Sample | (a) Composition % by weight STY | (a) Composition % by weight BUT | (b) Molecular Weight g/mol Mw | (b) Molecular Weight g/mol Mn | (c) Polydispersion index | Gel % | (d) Coupling efficiency % |
|---|---|---|---|---|---|---|---|
| A-B | 30 | 70 | 36.300 | 33.000 | 1.1 | 0 | = |
| A-B-A | 30 | 70 | 127.000 | 95.000 | 1.34 | 0 | ~90 |

Notes: See Table 1.

EXAMPLE 3

Into the reaction vessel described in Example 1, 50 g of α-methylstyrene and 1.2 mmol of Li-sec.butyl are charged, polymerizing at 20° C. for 1 hour and 15 minutes. At the end, 5 g of butadiene are introduced, allowing the products to react for 15' and then 500 cm³ of cyclohexane with 25 g of butadiene are introduced, the reaction being allowed to proceed at 60° C. for 1 hour. A small sample is drawn and 0.45 mmol of $A_2$ are then injected, the coupling reaction being conducted at the temperature of 95° C. for 30 minutes. In the usual way a polymer (43 g) is isolated, which shows the properties described in Table 3, wherein also the properties of the product A-B are reported.

TABLE 3

| Sample | (a) Composition % by weight α-STY | BUT | (b) Molecular Weight g/mol Mw | Mn | (c) Polydispersion index | Gel % | (d) Coupling efficiency % |
|---|---|---|---|---|---|---|---|
| A-B | ~30 | 70 | 49.000 | 44.000 | 1.12 | 0 | = |
| A-B-A | ~30 | 70 | 118.000 | 86.000 | 1.37 | 0 | >90 |

Notes: see Table 1.

EXAMPLE 4

The Test 2 is repeated, with the only difference that the compound $A_4$ (0.33 mmol) is used as the coupling agent at 110° C. for 1 hour. The pertaining data are shown in Table 4.

TABLE 4

| Sample | (a) Composition % by weight STY | BUT | (b) Molecular Weight g/mol Mw | Mn | (c) Polydispersion index | Gel % | (d) Coupling efficiency % |
|---|---|---|---|---|---|---|---|
| A-B | 30 | 70 | 30.000 | 28.000 | 1.06 | 0 | = |
| A-B-A | 30 | 70 | 152.000 | 110.000 | 1.38 | 0 | ~90 |

Notes: See Table 1.

EXAMPLE 5

Eight grams of styrene with 500 cm³ of cyclohexane and 1.0 mmol of Li-sec.butyl are charged, allowing the polymerization to occur at 60° C. over about 1 hour. Thirty-two grams of isoprene are added and the reaction is conducted as described in Example 1, by adding 0.45 mmol of $A_1$ and isolating the polymer (40 g).

The data pertaining to the products A-B and A-B-A are reported in Table 5.

TABLE 5

| Sample | (a) Composition % by weight STY | BUT | (b) Molecular Weight g/mol Mw | Mn | (c) Polydispersion index | Gel % | (d) Coupling efficiency % |
|---|---|---|---|---|---|---|---|
| A-B | 20 | 80 | 49.500 | 45.000 | 1.1 | 0 | = |
| A-B-A | 20 | 80 | 119.000 | 88.000 | 1.35 | 0 | ~85 |

Notes: See Table 1.

EXAMPLE 6

In the same reaction equipment as in preceding Examples, about 40 g of butadiene are polymerized at 60° C. for about 1 hour with 1 mmol of Li-sec.butyl in about 400 cm³ of cyclohexane. At the end, a mixture of $A_1$ (0.225 mmol) and $A_4$ (0.125 mmol) is added, allowing the reaction to proceed over 30' at 100° C. The G.P.C. diagram of the isolated polymer reveals the presence of peaks of the products with different coupling degree, and with a wider molecular weight distribution than that of A-B polymer.

We claim:

1. A method for the termination of living macroanions obtained by anionic polymerization of diene monomers containing 4 to 12 carbon atoms and/or vinylaromatic monomers containing 8 to 20 carbon atoms which comprises: adding to a polymerization mixture containing said macroanions an effective amount of a coupling agent of the formula:

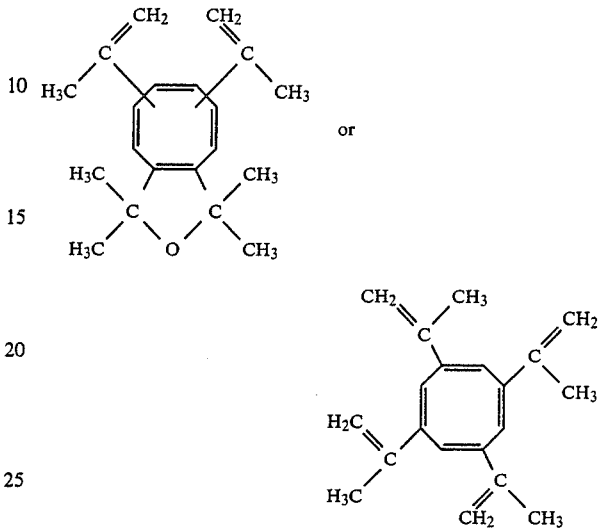

to terminate said living macroanions.

2. The method of claim 1, wherein said coupling agent is 5,7-di-isopropenyl-1,1,3,3-tetramethyl-1H,3H-cyclo-octa-[c]-furan.

3. The method of claim 1, wherein the coupling agent is 5,8-di-isopropenyl-1,1,3,3-tetramethyl-1H,3H-cyclo-octa-[c]-furan.

4. The method of claim 1, wherein the coupling agent is 1,3,5,7-tetra-isopropenyl-cyclo-octatetraene.

5. The method of claim 1, wherein said living macroanions are obtained by anionic polymerization of diene monomers containing from 4 to 8 carbon atoms.

6. The method of claim 5, wherein said diene monomers are selected from the group consisting of 1,3-butadiene, isoprene, 2,3-dimethyl-butadiene, piperylene, 3-butyl-1,3-octadiene and 2-phenyl-1,3-butadiene.

7. The method of claim 1, wherein said living macroanions are obtained by anionic polymerization of vinylaromatic monomers containing from 8 to 14 carbon atoms.

8. The method of claim 7, wherein said vinylaromatic monomers are selected from the group consisting of styrene, α-methylstyrene, 1-vinylnaphtalene, 2-vinylnaphtalene, 2-isopropenyl-naphthalene, p-phenylstyrene, 3-methylstyrene, α-methyl-p-methylstyrene, and p-cyclohexylstyrene.

9. The method of claim 1, which is carried out in the absence of polar activators.

10. The method of claim 1, which is carried out at a temperature between 50° to 150° C.

11. The method of claim 1, which is carried out at a temperature between 60° to 120° C.

* * * * *